Feb. 23, 1937.  B. A. SWENNES ET AL  2,071,588
AUTOMATIC CLUTCH
Filed May 6, 1932   3 Sheets-Sheet 3
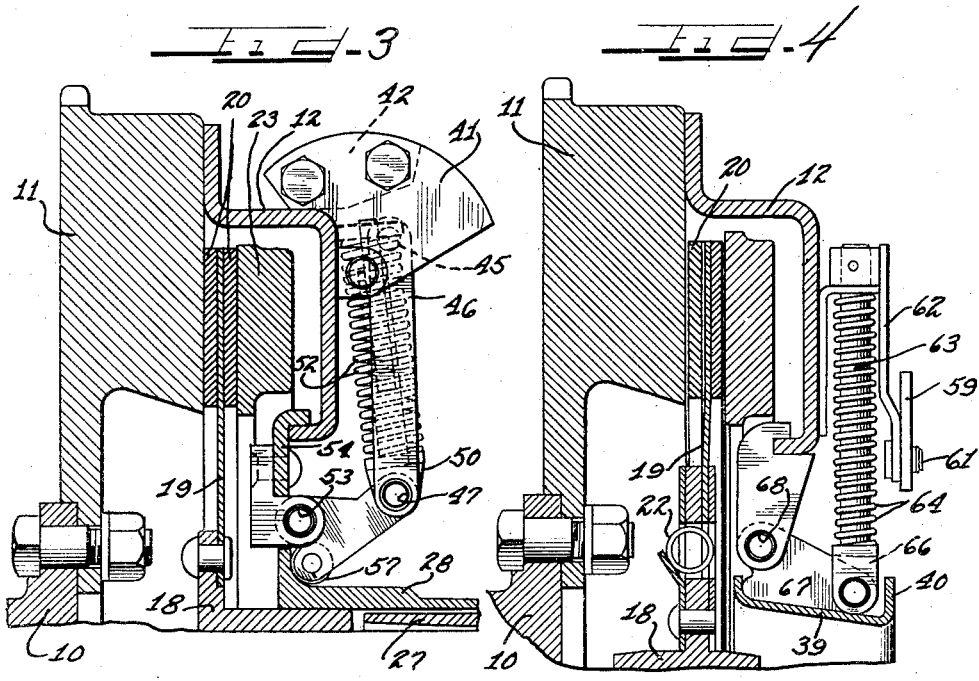
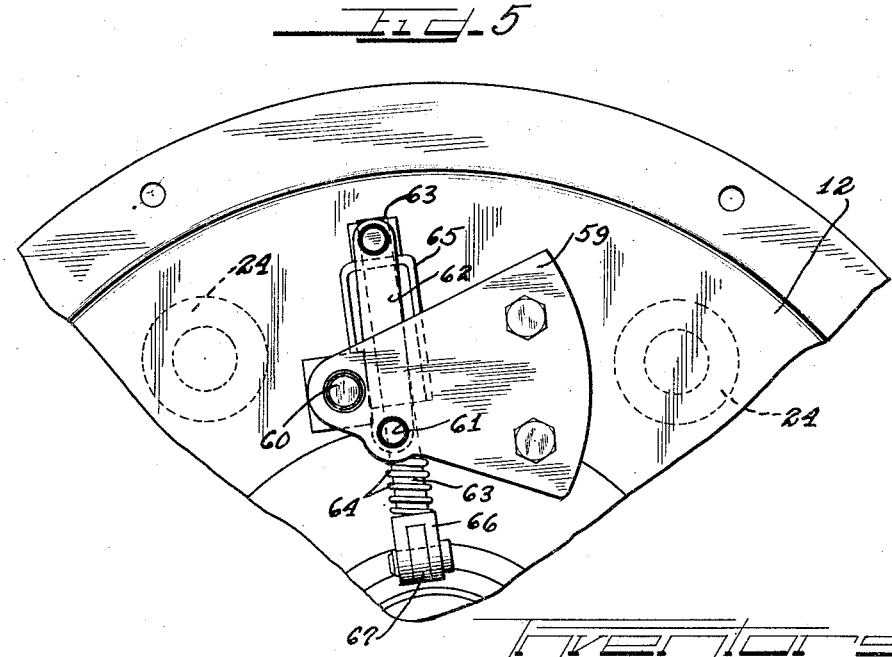

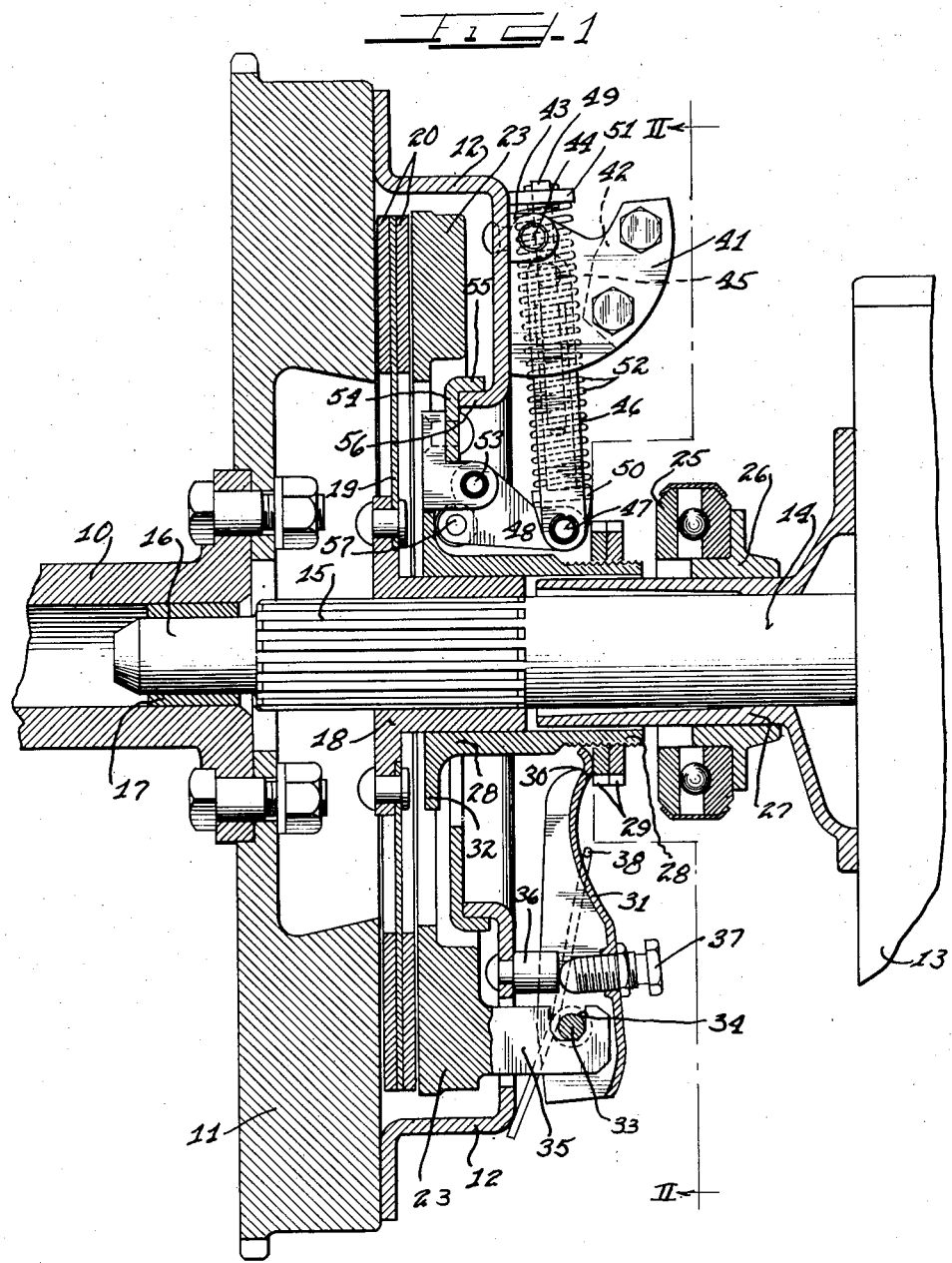

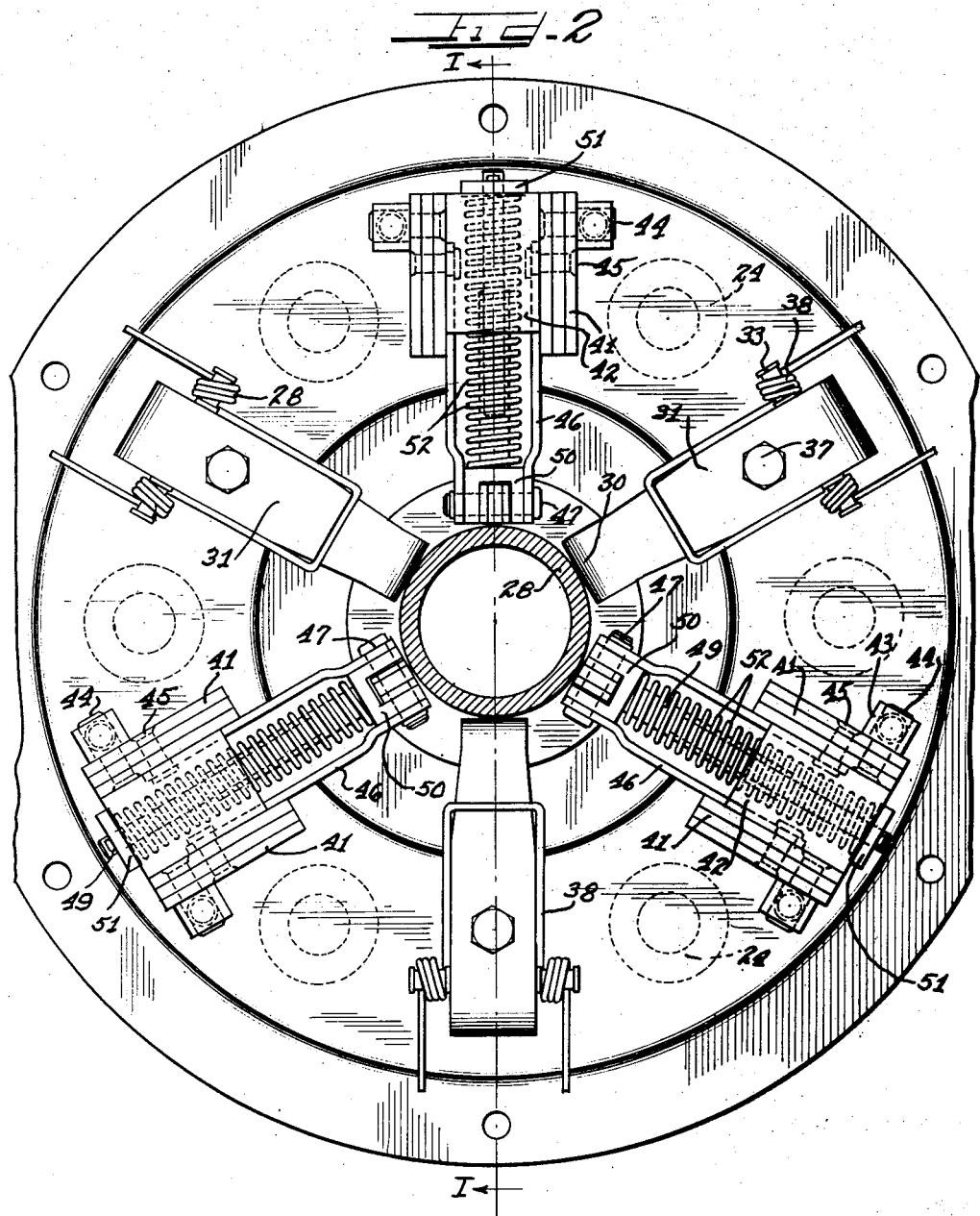

Patented Feb. 23, 1937

2,071,588

UNITED STATES PATENT OFFICE 2,071,588

AUTOMATIC CLUTCH

Benjamin A. Swennes and Kay Miller, Rockford, Ill.; said Swennes assignor to Borg-Warner Corporation, Chicago, Ill., a corporation of Illinois Application May 6, 1932, Serial No. 609,567

6 Claims. (Cl. 192—105)

This invention relates to automatic clutches of the centrifugally energized type wherein the clutch is disengaged below a predetermined rotative speed of the driving member. As one specific embodiment of the invention, an automatic clutch for automotive service has been chosen for illustration since in such service the driving member of the clutch is intended to automatically engage or disengage at rotative speeds slightly above idling, according to whether the driving member is accelerating or decelerating. Such an automatic clutch permits free wheeling at will and facilitates gear shifting without the need of manually releasing the clutch before shifting gears.

Centrifugally energized and other types of automatically operating clutches have been proposed heretofore but such clutches have not been satisfactory in service chiefly because of lack of control of the interval during which the clutch picks up the load, and because of the variation in engaging pressure in centrifugal clutches, which pressure varies as the square of the rotative speed and consequently builds up to enormous values at the top speeds commonly met with in automotive service. It is accordingly an object of this invention to provide an improved clutch of the centrifugally energized type wherein the maximum clutching pressure is predetermined and is reached at substantially the initial engaging speed so that the clutch is capable of carrying the full designed torque very near the lowest rotative speed at which the clutch engages.

It is another object of this invention to provide an improved and simplified automatic clutch embodying a manual throwout or disengaging mechanism operable at will without affecting the position of the centrifugal engaging mechanism and without having to overcome the forces generated thereby.

It is a further object of this invention to provide an improved and simplified automatic clutch wherein a predetermined clutch engaging pressure is adjustable and in which the force generated by the centrifugally responsive mechanism can be rendered effective to engage the clutch over a wide range of operating speeds as required by the conditions of a given installation.

It is also an object of this invention to provide an automatic clutch of the class described that will be easily adjustable for alignment, and to compensate for wear in the engaging parts.

It is also an important object of this invention to provide an improved and simplified automatic clutch structure wherein a predetermined yielding load accomplishes clutch engagement and is normally held out of engaging position by an overbalancing yielding load rendered ineffective above the desired engaging speed by means of centrifugally energized mechanism.

It is still a further object of this invention to provide an improved and simplified automatic clutch structure that will be economical to manufacture, install and service throughout its operating life.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical longitudinal section with parts in elevation of a clutch in its disengaged position embodying the preferred form of this invention, the section corresponding to the line I—I of Figure 2.

Figure 2 is a cross section with parts in elevation taken on the line II—II of Figure 1.

Figure 3 is a fragmentary section corresponding to Figure 1 showing the clutch in the automatically engaged position.

Figure 4 is a fragmentary section similar to Figure 1 embodying a modified form of centrifugally energized mechanism.

Figure 5 is a fragmentary rear elevation of the clutch of Figure 4.

As shown on the drawings:

The clutch chosen to illustrate the embodiments of this invention is intended to be interposed between the engine and the transmission of an automotive installation. The rear end of an engine crankshaft is indicated by the reference numeral 10 in Figure 1 and carries a flywheel 11, against the rear face of which is bolted a clutch housing 12. A transmission case 13 has a forwardly extending shaft 14 which passes through a central aperture in the housing and is provided with splines 15, the front end 16 of the shaft having a pilot bearing 17 in the engine crankshaft. The hub 18 of a clutch disc 19 is slidably mounted on the splined portion 15 of the shaft 14, which shaft will hereinafter be referred to as the driven shaft of the clutch. The clutch disc 19 carries the usual friction facing material 20 on both sides, and may embody a torsionally resilient mounting as indicated by the spring 22 in Figure 4 which spring is interposed between the disc and its hub to soften engagement shocks as well as prevent the transmission of torsional vibration to the gear train. The clutch disc 19 with its facings 20 is engaged between the rear face of the flywheel and a pressure plate 23 within the housing 12, the clutch disc serving to drive the driven shaft when the disc is clamped between the pressure plate and the flywheel. As is usual practice in manually operated clutches the pressure plate is spring loaded by a plurality of pressure springs 24 interposed between the housing and the plate as indicated by the dotted lines in Figure 2. These springs are preloaded to provide the desired total pressure on the pressure plate as required by the desired torque rating of the clutch.

The foregoing description applies to various practically standard types of single disc clutches which are manually thrown out of engagement by the usual foot pedal control. Since it is desirable to be able to disengage the clutch at will we have embodied such a manual control which however also forms part of the automatic control. The manual control shown comprises a throwout bearing 25 supported on a collar 26 sliding on a sleeve 27 enveloping the driven shaft 14, the collar 26 being shifted to the left in Figure 1 by the usual foot pedal operated linkage (not shown), when it is desired to manually disengage the clutch. Such movement of the collar 26 to the left causes the bearing 25 to overlap the end of a sleeve 28 longitudinally slidable on the clutch disc hub 18, the bearing 25 engaging against a pair of lock nuts 29 threaded on the sleeve and in turn bearing on the inner ends 30 of throwout fingers 31. The outer ends of the fingers carry pins 33 engaging an aperture 34 in bosses 35 formed on the pressure plate; the fingers being adjustably fulcrumed on buttons 36 on the housing by means of adjustable cap screws 37 in the fingers. Thus a leftward shift of the sleeve 28 caused either by the automatic control to be presently described, or by the manual control, causes the throwout fingers to lift the pressure plate away from the clutch disc against the pressure of the pressure springs 24. The throwout fingers are retained in the apertures 34 in the pressure plate bosses 35 by means of torsion springs 38 coiled on the ends of the pins 33 which springs also prevent rattling thereof. It will be evident from the foregoing that a movement of the sleeve 28 to the right from the position of Figure 1 to that of Figure 3 will release the pressure fingers and allow the pressure springs 24 to force the clutch pressure plate into full engagement with the clutch disc.

Two forms of automatic control, alike in principle, are shown in Figures 1 and 4, these controls acting against the sleeve 28 in Figure 1 to normally hold the same to the left, causing disengagement of the clutch, until a rotative speed is reached sufficient to energize the centrifugally responsive mechanism whereupon the sleeve 28 is released and allowed to move to the right, in turn allowing the pressure springs 24 to move the pressure plate into the clutch engaging position shown in Figure 3. While the action of both forms of centrifugally energized mechanisms is alike in principle, the form of Figures 4 and 5 utilizes a modified form of sleeve 39 similar in action to the sleeve 28 although not guided on the clutch disc hub and being provided with an upturned flange 40 as a substitute for the adjustable lock nuts 29 of the first described embodiment of the invention.

The centrifugally energized mechanism of Figures 1 to 3 comprises pairs of spaced weight members 41 connected by bridges 42 which increase the effective weight and leverage of the assembly, which is pivoted to brackets 43 on the housing 12 by means of pins 44 so arranged as to leave a central gap therebetween. The assembled weights are so formed and pivoted as to swing outwardly, in a radial plane relative to the clutch axis, under the influence of centrifugal force, until the weights finally come to rest against the housing 12 as shown in Figure 3. The bridges 42 are shown as bolted between the spaced side members in Figures 1 and 3 the bolts being omitted in Figure 2 to avoid confusing the showing of the pivot and fulcrum points in the latter figure. Each side member carries an offset fulcrum pin 45 connected by links 46 to a pin 47 at the outer end of a lever 48. A spring guide rod 49 telescopes in the shank of a yoke 50 on the pin 47 and has its outer end secured by a collar and pin on opposite sides of a lug 51 on the housing, a spring 52 being interposed between the lug and the yoke 50 which spring acts to oppose the outward movement or response of the weights to centrifugal forces acting thereon. It will be evident that the degree of preloading of the springs 52 will determine the rotative speed at which the weights swing outwardly since centrifugal force varies as the square of the rotative speed.

The lever 48 is fulcrumed at 53 to a disc-like member 54 attached to the housing 12 by means of a flange 55 turned over a mating flange 56. Functionally the disc-like member is equivalent to a continuation of the housing 12 so that the lever 48 has its pivot 53 fixed relative to the housing. The lever 48 also carries a roller 57 bearing against a flange 32 on the sleeve 28, the arrangement being such that the combined forces of the springs 52 acting through the lever 48 and roller 57 are sufficient to overbalance the clutch pressure plate springs 24 acting through the throwout fingers, thus holding this sleeve 28 in the position of Figure 1 until enough centrifugal force is generated by the weights 41 to compress the springs 52 and thus pivot the lever 48 counterclockwise about its fulcrum into the position shown in Figure 3, which allows the sleeve 28 to shift to the right in turn permitting full clutch engagement since such movement releases the throwout fingers which hold the pressure plate retracted.

The clutch action is dependent on the overbalancing of the effective force of the pressure springs 24 acting through the throwout levers 31 on the sleeve 28 as affected by the effective force of the springs 52 acting through the levers 48 on the sleeve flange. The degree or extent of the total unbalanced spring forces, together with the effective radius, weight, and leverage of the centrifugal weights, determines the rotative speed required for automatic clutch engagement. These variables are all subject to the designer's control so that the engagement speed can be predetermined and varied to suit the requirements of different installations. Also the effective clutch engaging pressure is predetermined and subject to design control so that the clutch is not subject to excessive pressures at the higher operating speeds.

It will be noted that the centrifugally energized weights only have to overcome the excess spring load or differential, the pull of the pressure springs 24 through the throwout levers tending to pull the sleeve 28 to the right thus acting to supplement the action of the centrifugal weights in overcoming the effect of the springs 52. A manual release of the clutch will push the sleeve 28 to the left and out of contact with the rollers 57 without affecting the position of the automatic engagement mechanism in any way; the action of the manual release being to pivot the release levers 31 counter-clockwise to lift the pressure plate away from the clutch disc.

The modified form of centrifugally energized mechanism shown in Figures 4 and 5 embodies a plurality of weighted elements 59 which may be conveniently called centrifugal weights, these weights being pivoted at 60 to the housing to swing in a plane parallel thereto. The weights 59 carry eccentric fulcrum pins 61 connected by a link 62 to the outer end of a rod 63 which forms a guide for an enveloping spring 64 mounted between a lug 65 on the housing and a yoke end 66 on the rod 63 which is pivoted to a lever 67 fulcrumed at 68. The similarity of this structure to that first described will be evident as the weights 41 and 59 correspond in function; as do the springs 52 and 64; the rods 49 and 63; and the levers 48 and 67; the operation of the two forms being substantially alike.

While the operation of the clutch of this invention has been described in connection with the various elements thereof, it will be convenient to summarize the operation of the clutch as a whole at this point. The centrifugal weights are so proportioned as to come into action at rotative speeds somewhat above idling, the springs thereon normally overbalancing the clutch pressure springs by an amount determining the rotative speed at which the clutch engages. It will thus be evident that at idling speeds the clutch is automatically disengaged and comes into action as the engine is speeded up, as is the normal practice when picking up the load after engaging the transmission gears. The initial clutch engagement is produced by the initial outward movement of the weights but since the weight springs oppose clutch engagement the full clutch engaging pressure is not developed until the weights completely overcome the spring pressure at a higher rotative speed than that of the initial engagement. Thus the clutch cannot grab as there is a slip range through which the engine must be accelerated and during which the clutch pressure increases to the maximum designed value so that the load is picked up smoothly with enough clutch slippage permitted to avoid shocks on the transmission train.

It will thus be seen that we have invented an improved and simplified automatic clutch that is simple and reliable in action and which can be manually released at the will of the operator without affecting the automatic engagement mechanism or adding the load thereof to the manual throwout mechanism.

We are aware that many changes may be made and numerous details of construction may be varied through a wide range without departing from the principles of this invention, and we therefore do not purpose limiting the patent granted hereon otherwise than necessitated by the prior art.

We claim as our invention:

1. In combination with a manually controllable friction clutch wherein a pressure plate is manually retractable through throwout fingers to cause clutch disengagement and advanceable to cause clutch engagement coincidentally with moving said throwout fingers, a separate control mechanism releasably restraining said throwout fingers to preclude the advance of said pressure plate below a predetermined rotative speed, and speed responsive means for releasing said separate control from the throwout fingers above such predetermined speed.

2. In an automatic clutch including driving and driven members, a pressure plate movable to compress said members into frictional engagement, and yielding means normally holding said plate in a position causing compression of said members, a clutch throwout mechanism adapted to move said plate in a manner releasing the compression of said driving and driven members, energizing means associated with the driving member and adapted in its initially energized position to be interposed in said manual clutch throwout mechanism to hold the clutch disengaged, and centrifugal means adapted to move said energizing means out of operative engagement with the manual clutch throwout mechanism upon attaining of a predetermined rotative speed.

3. Automatic clutch mechanism comprising relatively movable driving and driven friction members, yielding means expansible axially of said clutch mechanism for coengaging said friction members, counteracting means normally precluding coengagement of said friction members by opposing the force of said yielding means and comprising energizing means expansible radially of said clutch mechanism, and speed responsive means operative to overcome the effect of said counteracting means by controlling the energy of said energizing means incident to a predetermined rotative speed of said driving friction member.

4. In combination with a yieldingly engaged clutch including a manually operable clutch disengaging mechanism operable through throwout fingers to force the clutch out of engagement, of retractable means also operable through said throwout fingers to force the clutch out of engagement, and centrifugally responsive means becoming energized at a predetermined speed to retract said retractable means out of operable association with said throwout fingers so as to permit normal engagement of the clutch without affecting the movement of the manually operable disengaging mechanism.

5. In an automatic clutch including driving and driven members, a pressure plate advanceable to compress said members into frictional engagement and retractable to release such compression of the members, yielding means tending to advance said plate, a manual clutch throwout mechanism adapted to retract said plate, a lever pivotal between a first position wherein it is interposed in said manual clutch throwout mechanism and effective to hold the pressure plate retracted and a second position wherein it is out of operative association with the manual clutch throwout mechanism and hence uneffective to retract said pressure plate, centrifugal means movable with said driving member, said centrifugal means being operative to pivot said lever into the second position upon the attainment of a predetermined speed by said driving member, and means for returning said lever to said first position as an incident to said driving member assuming a speed less than said predetermined speed.

6. A clutch comprising engageable driving and driven clutch parts, a pressure plate advanceable into a position causing clutch engagement and retractable into a position causing clutch release, means yieldingly urging said pressure plate into the advanced position, clutch throwout means manually operable to move said pressure plate into the retracted position, said throwout means being movable as an incident to movement of said pressure plate into the advanced position, and speed responsive means disposed for obstructing such movement of said clutch throwout means and advancement of said pressure plate during low speeds of the clutch driving part and being removed into an unobstructing position at higher of such speeds, said speed responsive means being separable from said throwout means thus permitting of independent operation of said throwout means to retract said pressure plate while said speed responsive means is in the unobstructing position.

BENJAMIN A. SWENNES.
KAY MILLER.